United States Patent [19]

Duke et al.

[11] 3,829,242

[45] Aug. 13, 1974

[54] PISTON PUMP FOR SOFT SERVE MACHINE

[75] Inventors: Gene S. Duke, East Moline; Lawrence E. Heatherly, Green Rock, both of Ill.

[73] Assignee: H. C. Duke & Son, Inc., East Moline, Ill.

[22] Filed: Dec. 4, 1972

[21] Appl. No.: 311,685

[52] U.S. Cl............ 417/38, 62/70, 62/366, 417/566
[51] Int. Cl. ... F04b 49/00, F04b 21/02, F04b 39/10
[58] Field of Search ......... 417/503, 440, 566, 454, 417/360; 62/70, 366

[56] References Cited
UNITED STATES PATENTS

| 593,936 | 11/1897 | Haney | 417/503 |
|---|---|---|---|
| 2,266,126 | 12/1941 | Malsbary et al. | 417/503 |
| 2,424,595 | 7/1947 | Warren | 417/566 |
| 2,566,436 | 9/1951 | Waite | 417/566 |
| 2,957,430 | 10/1960 | Naef | 417/454 |
| 3,172,365 | 3/1965 | Nasuytis | 417/360 |
| 3,304,737 | 2/1967 | Strutynski | 62/70 |
| 3,434,808 | 3/1969 | Popst, Jr. | 417/566 |
| 3,697,197 | 10/1972 | Berglund et al. | 417/360 |

FOREIGN PATENTS OR APPLICATIONS

| 486,326 | 11/1953 | Italy | 417/566 |
|---|---|---|---|

*Primary Examiner*—William L. Freeh
*Attorney, Agent, or Firm*—Harbaugh and Thomas

[57] ABSTRACT

A single piston positive displacement pump for confectionery products is disclosed wherein the mix and air are drawn into a cylinder simultaneously through separate passages past one-way valve members and displaced directly or indirectly into the freezing chamber by the piston through a common conduit controlled by a sleeve type one-way check valve. The pump and valve action draws the mix and air into the cylinder on one side of the piston and discharges a uniformly aerated mixture with reduced air bubble size into the freezing chamber to produce a smoother, tastier product without the necessity of extensive mechanical blending in the freezer and with increased freezing efficiency.

25 Claims, 10 Drawing Figures

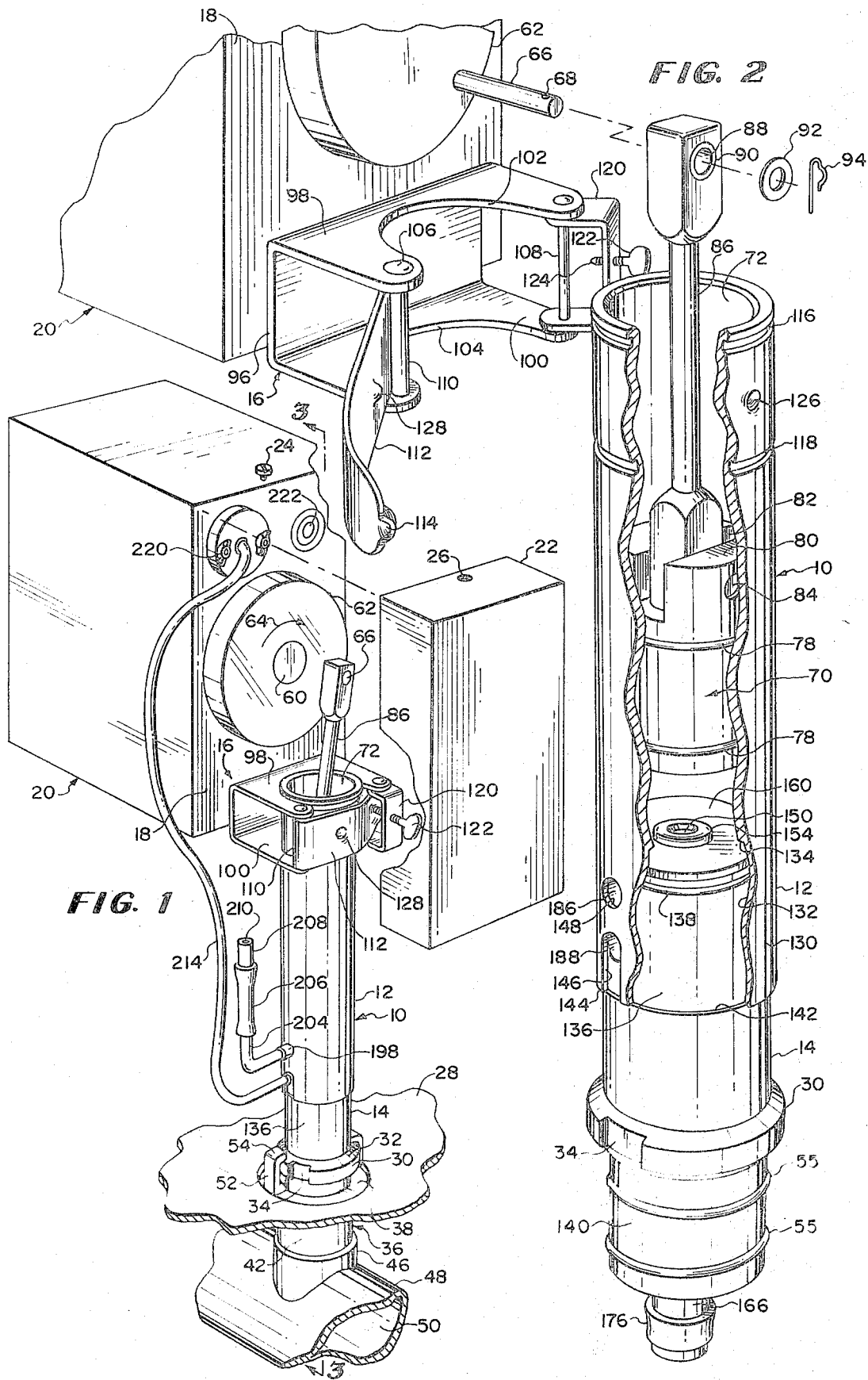

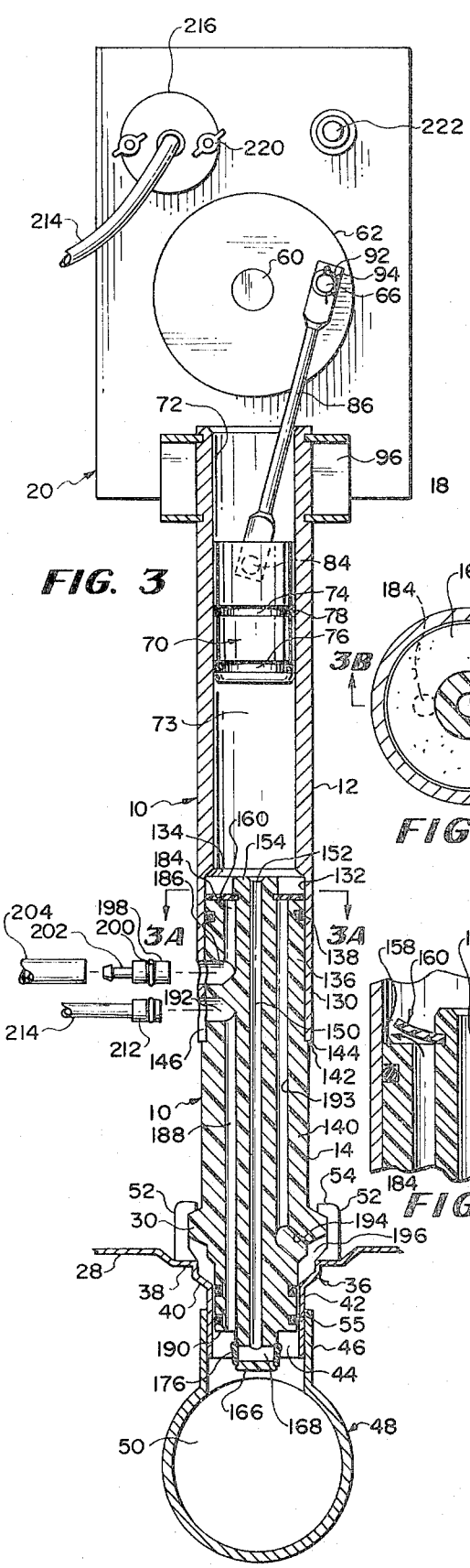
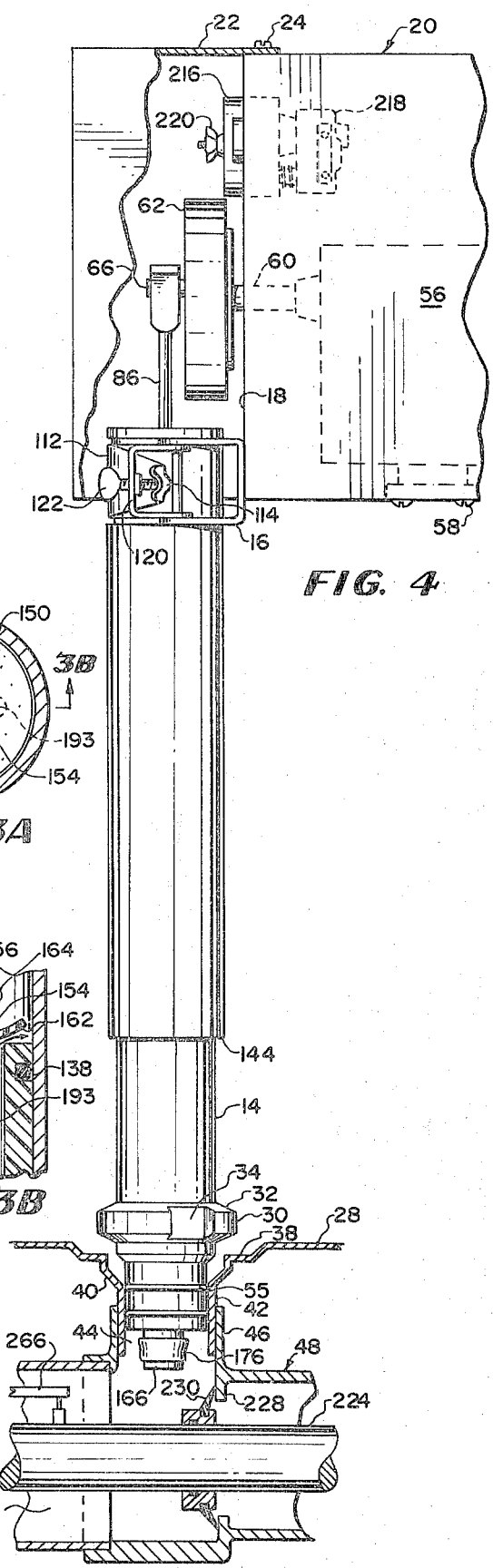
FIG. 3
FIG. 3A
FIG. 3B
FIG. 4

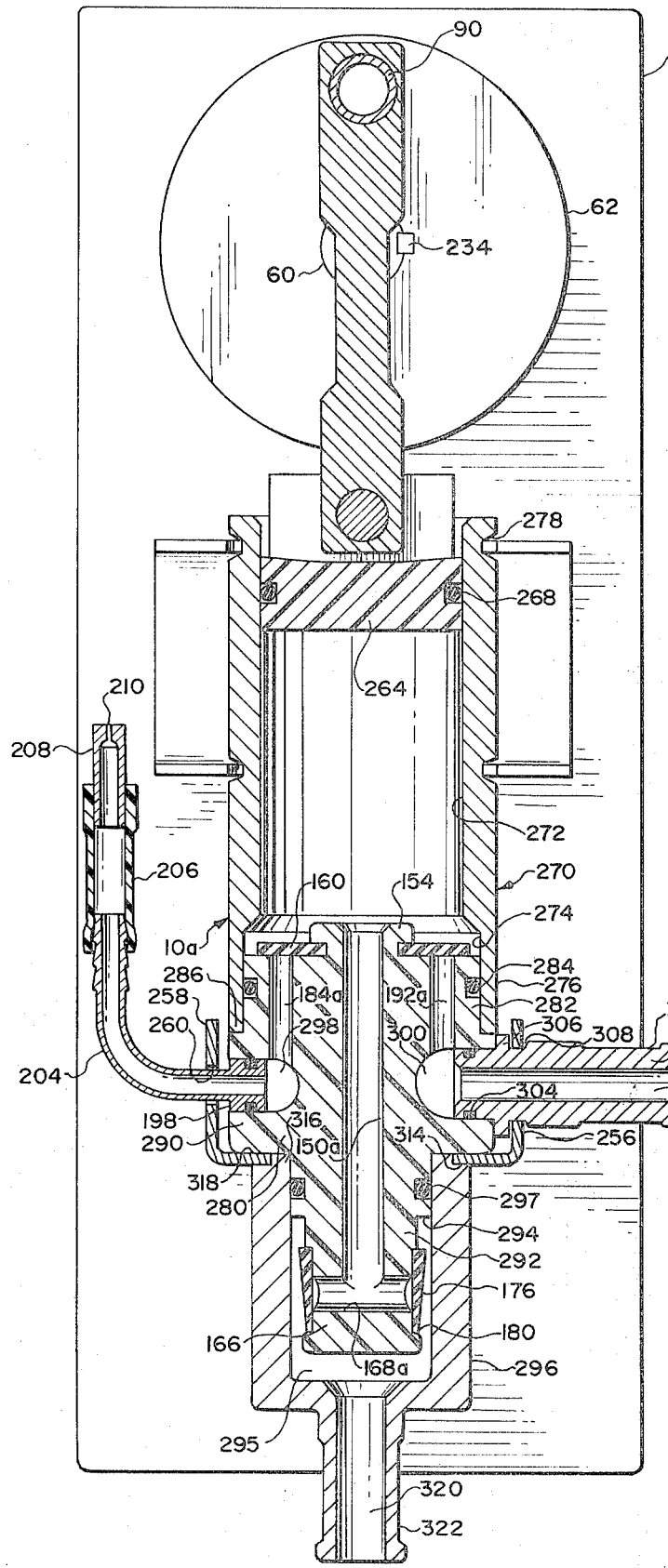

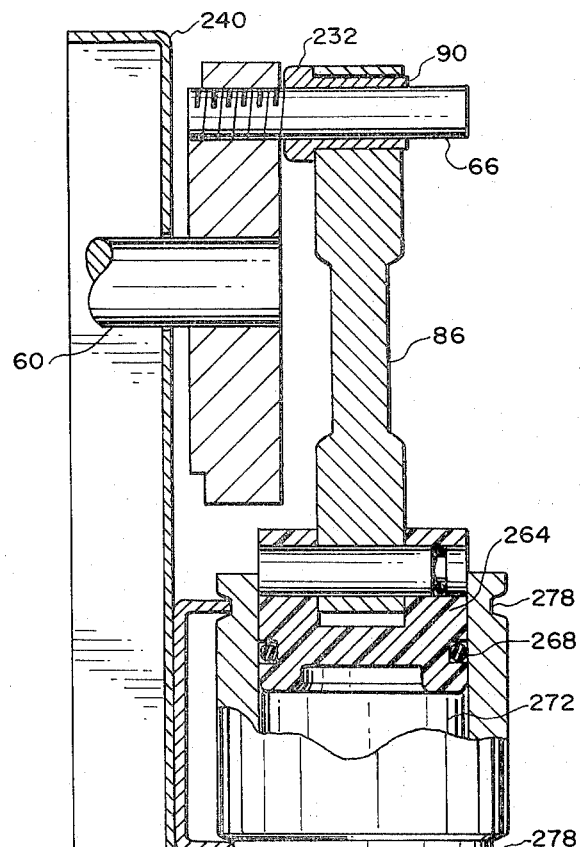
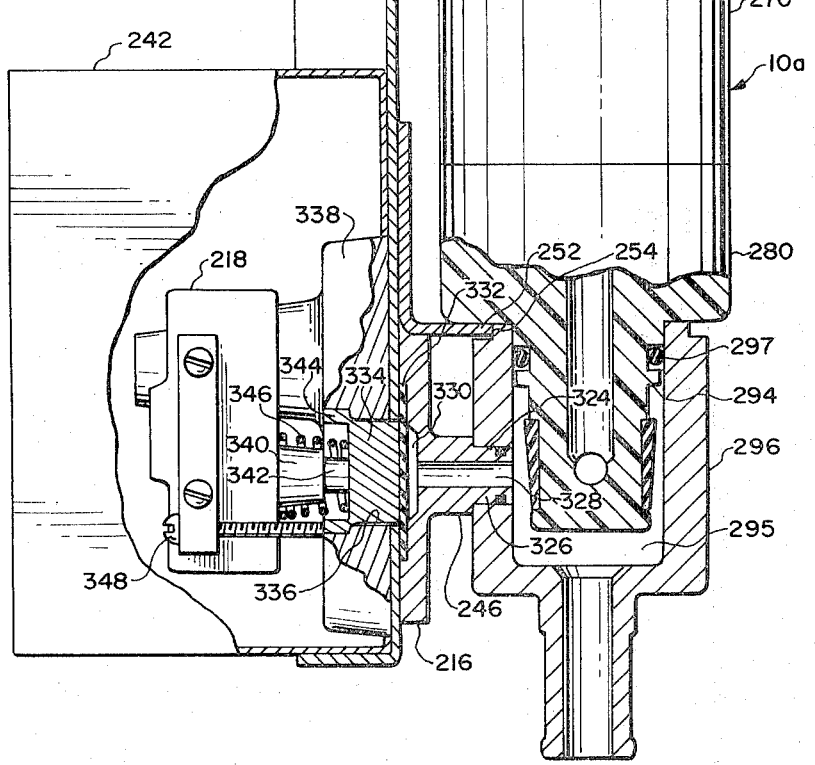
FIG. 8

PISTON PUMP FOR SOFT SERVE MACHINE

BACKGROUND OF THE INVENTION

The usual method of producing a soft-serve confectionery or ice cream product is to inject the basic mix, comprising water, milk, sugar solids, butterfat and flavoring, and air into a freezing chamber provided with rotating scrapers. Simultaneous agitation and freezing take place and the process must be carefully controlled to prevent large ice crystal growth.

Although pre-mixing of air and mix is desired, the mechanics of handling two fluid media where one is a gas and the other a syrup is a problem. Reciprocating piston pumps are well known as applied to the movement of a single liquid media of low viscosity but they cannot be adapted to handle more viscous liquids or two media simultaneously without certain drawbacks. The intake of some forms of these pumps is at the bottom center of the cylinder through a one-way valve that allows the liquid to enter a lower compartment in the piston. The piston wall defines an annular space with the cylinder and the annular space communicates through radial ports with the lower compartment of the piston. After a few strokes the pump discharges on each up and each down stroke; preferably the volume is equal on the two strokes. Pumps such as this are very difficult to clean and maintain because of the spacing of the parts. Other piston pumps for soft-serve ice cream dispensers employ spring-actuated ball check valves where delivery of a liquid and air in a set ratio is desired. Air is drawn past one ball check valve into the cylinder on one side of the piston as it moves in one direction. Liquid is drawn past another ball check valve into the cylinder on the other side of the piston. The air inlet passage has a passage leading to an adjustable bleed valve with a bleed orifice at one end and still another ball check valve at the opposite end at the top of a discharge chamber. The discharge port at one end of the cylinder is normally closed by a ball check valve and this discharge passage leads to the downstream side of the air inlet passage into a discharge. A pump such as this delivers liquids under pressure past the ball check valve at the end of the cylinder into the discharge chamber on one stroke and air into the same chamber on the opposite stroke. Thus the slugs of air and liquid mix are alternated and product consistency is not uniform.

Still other soft-serve frozen confection processing machines employ gear pumps with the air inlet at the periphery of one gear and the liquid inlet at the periphery of the other. Some kind of adjustable baffle element is required to miniaturize the air bubbles. Homogenizers are also employed prior to freezing of confectionery products.

As is apparent the prior art pumps either handle a single fluid media or employ complicated passages and bypasses which discharge the gas and liquid media to a separate mixing zone. Ball check valves are particularly difficult to maintain, clean, and are not trouble free when it comes to handling syrup-like mixes. The myriad of passages and bypasses through which air and mix pass or surge are sources of contamination since they cannot be cleaned properly without extra care or dismantling of the pumps. Some kind of balance must be struck between simplicity of design, ease of cleaning, sanitation, etc. and pumping and mixing efficiency.

It is paramount that equipment of this kind be simple in design, operation and maintenance since it is operated and cared for by unskilled personnel and public health is involved.

To these ends the instant invention is directed by providing a single piston positive displacement pump, as an integral part of a soft-serve freezer or for use remotely therewith. In one embodiment the pump is carried within or partially within the mix reservoir and is directly connected to the freezing chamber therebelow. The lower or discharge end of the pump is detachably locked and sealed through the bottom wall of the mix reservoir within a passageway communicating directly with the freezing chamber. A quick release easily cleaned bayonet-type lock ring and retaining stud arrangement is used. Both mix and air are forced into the pump cylinder through adjacent passageways by atmospheric pressure and the overrun ratio is controlled by an easily adjusted air metering orifice. On the return stroke of the piston, the pressure in the air-mix mixture is greater than the freezer chamber pressure and the mixture is forced directly into the freezer chamber through a rubber sleeve check valve at the bottom of the pump housing inside the freezer chamber. The pressure in the freezing chamber is controlled through a direct-acting pressure switch.

In another embodiment the pump is adapted for use remote from the freezing chamber and a mix outlet chamber is employed with a hose connection to the freezer chamber. In both embodiments all passageways are open-ended and essentially straight-line bore holes so that proper cleaning is facilitated. The valve parts are readily dismantled and of simple configuration so that sanitation is no problem. Also the various parts fit together readily, form effective seals at their interfaces and the manner of assembly can be ascertained by mere inspection of the parts by unskilled help.

DESCRIPTION OF THE DRAWINGS

Illustrative embodiments of this invention are shown in the drawings wherein:

FIG. 1 is a perspective view of a pump (with the cover shown detached from the drive unit) adapted for connection through the bottom of a mix reservoir directly to a freezing chamber (shown in partial section) as might be used in a self-contained confectionery machine;

FIG. 2 is an enlarged perspective view of the pump of FIG. 1 with the pump cylinder wall cut away and also showing the support clamp in released position as the pump is removed or about to be re-installed in relation to the drive unit;

FIG. 3 is a partial cross-sectional view taken along the lines 3—3 of FIG. 1 to show the relationship of the passageways and valve members inside the pump;

FIG. 3A is a cross-sectional view taken along the lines 3A—3A of FIG. 3;

FIG. 3B is a cross-sectional view taken along the lines 3B—3B of FIG. 3A;

FIG. 4 is a side plan view, partly in cross-section of the pump shown in FIGS. 1, 2 and 3 showing primarily the relationship of the pump outlet and the freezing chamber;

FIG. 6 is a cross-sectional view taken along the lines 6—6 of FIG. 5;

FIG. 7 is a perspective view of the bottom valve of the pumps of this invention with the flexible valve member cut away to show its relation to the discharge ports;

FIG. 8 is a cross-sectional view of the pump of FIGS. 5 and 6 to show the relationship of the parts at the top of the piston stroke and also the arrangement of the pressure control switch.

DESCRIPTION OF THE PREFERRED EMBODIMENTS

Figure 5:
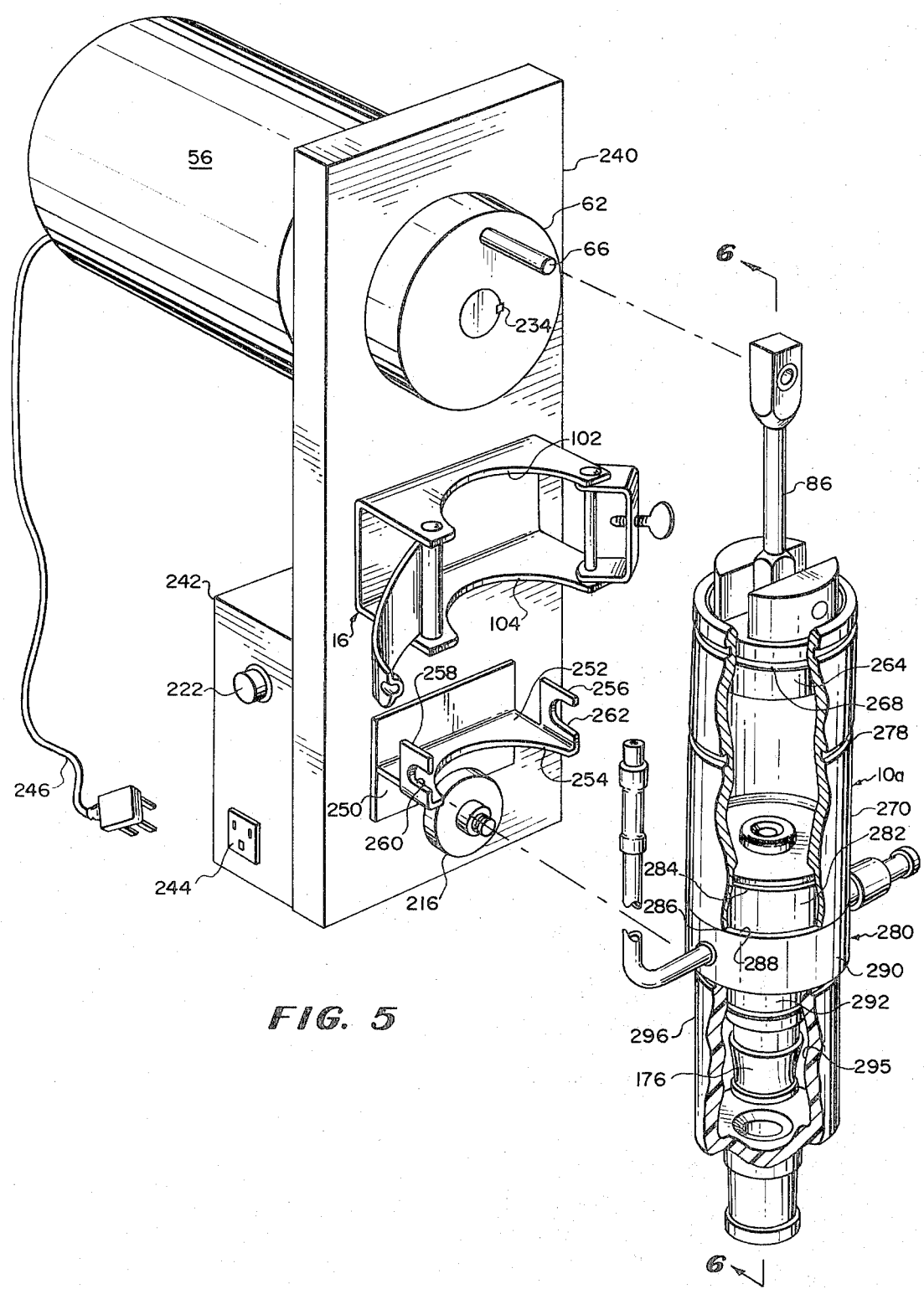
FIG. 5 is a perspective view of a mixing pump for use remotely of both the mix reservoir and freezing chamber, with the pump cylinder wall cut away and also showing the support in release position as in FIG. 2.

In FIG. 1 the piston pump 10 is shown having the cylinder housing 12 with the bottom portion thereof in telescoping relationship over the top part of the pump valve housing 14. The top of the cylinder housing 12 is supported in a vertical position by means of the clamp assembly 16 which is attached to the front wall 18 of the motor drive housing 20. The clamp 16 and the exposed moving parts of the drive (to be described) are enclosed by the box-like cover member 22 held in place by the screw 24 engaging a suitable hole 26 in the top wall. A suitable support (not shown) is provided for the motor drive housing, such as a stationary shelf associated with a confectionary service counter.

The pump 10 is adapted to be inserted through a suitable opening in the top wall of a mix reservoir at a service counter and partially submerged in the liquid composition. These reservoirs are of different designs and for purposes of illustration only the bottom wall 28 is shown, it being understood that the liquid level therein will be above any mix inlet ports and below any air inlet orifices of the pump. Mix reservoirs have a top opening for the introduction and mixing of the ingredients to be processed and are provided with a sanitary cover which is not hermetically sealed so that the mix composition is at ambient pressure conditions.

Intermediate its ends, the pump valve housing 14 is provided with a circumferential radial locking shoulder 30 having the tapered or beveled top surface 32 and at least a pair of slots 34 positioned on opposite sides of the pump valve housing. Only one slot 34 is visible in FIG. 1.

In order to receive the lower end of the pump valve housing the mix reservoir is provided with the tubular shaped outlet 36 depending from and integral with its bottom wall 28. Referring briefly to FIGS. 3 and 4 it is seen that the outlet 36 is shaped to include the downwardly recessed wall 38 and the conical wall portion 40 connecting with the tubular neck 42 defining the bottom opening 44. The neck 42 is received in telescoping relationship within the upright tubular inlet 46 of the elongated freezing chamber 48 defining the refrigerated space 50. This structure provides a convenient recessed outlet opening for inserting and connecting the piston pump 10 into communication with the freezing chamber 48.

The recessed wall 38 and the beveled or conical wall 40 guide and orient the pump valve housing into its proper position. A pair of upstanding lug members 52 is affixed to the recessed wall 38. These lug members are diametrically opposite one another or otherwise radially oriented and have their inner locking ears 54 shaped and of such a size as to pass through the slots 34 and upon turning, engage over the beveled top surface 32 in locking relationship. Proper sealing of the internal juncture of the bottom end of the pump 10 with the bottom wall 28 of the reservoir is accomplished by means of the pair of O-rings 55 carried in suitable circumferential grooves at the bottom of the pump valve housing 14 (FIG. 3).

FIG. 4 shows the general location of the electrical drive motor 56 within the housing 20 held in a fixed position by the mounting screws 58. The driven shaft 60 extends through the front wall 18 and carries the drive plate or wheel 62 at the extended end for rotation therwith as in the direction of the arrow 64 (FIG. 1). The crank pin 66 is affixed to and extends from the outside of the drive wheel 62 at a position radially offset from the shaft 60. The crank pin 66 has the transverse bore hole 68. A rotary crank means is thus provided as the drive for the pump.

The piston 70 (FIG. 2) is carried within the cylinder bore 72 of the cylinder housing 12 and includes a pair of axially spaced grooves 74 and 76 (FIG. 3) which retain the pair of O-rings 78, serving to seal the piston against the cylinder bore as it reciprocates. At the top of the piston 70 there is provided a pair of opposed lugs 80 defined by the cross slot 82, having a transverse axially aligned bore to receive the wrist pin 84. The connecting rod 86 has a cross bore 88, with a suitable bushing 90 to engage the wrist pin 84 and the crank pin 66 as illustrated in FIG. 3. The connection of the bottom end of the connecting rod with the wrist pin 84 is also provided with a suitable bushing (not shown).

As shown in FIG. 3 the quick connection of the top end of the connecting rod to the crank pin is facilitated by the washer 92 and the retainer clip 94, the longer shank of the latter engaging through the cross bore 68 on the end of the crank pin 66 in a known manner.

The bracket assembly 16 provides a means whereby the piston pump 10 is held at a fixed height on a vertical axis and a fixed distance from and properly oriented axially in relation to the crank drive means 62 and the crank pin 66. For this purpose the bracket assembly includes a suitable base plate 96 having integral vertically spaced identical flanges 98 and 100 each provided with a semi-circular or arcuate notch or opening in their edges as illustrated at 102 and 104. Each of the pairs of extended ends or ears of the flanges 98 and 100 is provided with a bore hole to receive the rivet hinge pins 106 and 108. The pin 106 is rotatably received within the rolled tubular end 110 of the pivotal latch 112.

The latch 112 is long enough to bridge the extended ends of the flanges 98 and 100 so that the end indentation 114 reaches the proximity of the pin 108 and at the same time encompasses the cylinder housing 12. The outer surface of the cylinder housing 12 has a pair of circumferential grooves 116 and 118, so spaced as to be engaged by the arcuate notches 102 and 104, respectively, and hold the pump 10 from displacement along its vertical axis. The U-shaped bracket 120 with the locking screw 122 is pivotally mounted on the other pin 108.

It is thus seen that with the bottom of the pump valve housing 14 inserted into the tubular neck 36 and the pump turned to lock the lugs 54 upon the shoulder 30, the bearing 90 of the crank arm 86 can be readily slipped over the crank pin 66. Simultaneously the cylinder housing 12 fits against the bracket 16 with the inner portion of the grooves 116 and 118 engaged by the edges of the arcuate notches 102 and 104. In this position the latch 112 can be swung about the pin 106 against the front side of the cylinder 12 with the indentation about opposite the pin 108. The U-shaped bracket 120 is swung over the end of the latch 112 and the screw 122 tightened with the tip 124 engaged within the indentation 114 in locked relationship.

To facilitate this orientation and properly align the other components, as will be described, and in addition assure fool-proof assembly, the identation 126 is provided at a selected position on the outside cylinder housing 12. The latch arm 112 has the protuberance 128 intermediate its ends to engage with the indentation 126 and properly orient the pump while preventing it from rotating about its vertical axis during operation. Enough tolerance in the crank assembly is provided so that the connecting rod 86 is readily aligned with the crank pin 66. Optionally the washer 92 is then placed over the protruding end of the crank pin 66 and the retainer clip 94 inserted in the bore 68.

Still referring to FIGS. 1-3 it is seen that the cylinder housing 12 is open-ended making it possible to remove the piston 70 for cleaning. Also the lower section 130 of this housing has an internal bore 132 that is slightly larger than the cylinder 72 and is open at the bottom end. The juncture of these bores defines the tapered inner shoulder 134. The top section 136 of the pump valve housing 14 is of a slightly lesser diameter than the bore 134 so that these parts fit one into the other with close tolerance and are sealed by the "O" ring 138 provided near the top end and seated in a suitable circumferential groove.

The lower section 140 of the pump valve housing is larger in diameter than the bore 132 and the juncture with the top portion defines the circumferential shoulder 142. The enlarged bore 132 is longer than the effective length of the top section 136 so that the bottom edge 144 of the cylinder housing 12 may rest upon the shoulder 142, thus fixing the length of the assembled pump. The open-ended slot 146 is provided in the bottom edge 144 and the side bore 148 is located thereabove for purposes to be described. These openings are positioned at any selected angle, preferably about 90° from the indentation 126.

Referring to FIGS. 3, 3A and 3B in particular there are shown the various passageways within the body of the pump valve housing 14 to include the central bore or passage 150 having its top opening 152 slightly chamfered and in open communication at all times with the mixing chamber 73 of the cylinder bore 72 below the piston 70. This end of the pump valve housing 14 has the boss or extension 154, through which the passage 150 passes, with the annular groove 156 about the base with the bottom edge of the groove substantially coplanar with the flat valve seat 158 forming the top end of the valve housing 14. The annular groove 156 receives the inner edge of a central hole of the flexible one-way disc valve member 160 having a smooth bottom surface 162. The outer corner edge 164 of the boss 154 is also chamfered to facilitate insertion of the central hole of the disc valve thereover. The closed position of the disc valve 160 is shown in FIG. 1 while its open position is shown in FIG. 3B.

The bottom end of the valve housing 14 is inset around its periphery to define the extension or boss 166 having the cross bore or passage 168 spaced from the end which intersects with the lower end of the central passage 150. This structure is better illustrated in FIG. 7 wherein the boss 166 has the wide annular groove 170 of reduced diameter defined between the upper circumferential inset 172 and the opposing circumferential inset 174 defining the terminal flanged end 175. The circumferential surface of the groove 170 is essentially cylindrical and devoid of irregularities since it functions as a valve seat particularly around the exits of the cross bore 168 which is in open communication through the annular grooved portion 170. A frustrum shaped one-way valve member 176 encompasses and is contained within the annular groove 170 with its thicker base end 178 retained against the top edge 172 and its bottom, thinner and more flexible edge 180 spaced slightly from the lower inset 174 of the flange 175. More than one radial passage 168 can be used at the discharge end of the valve assembly. The closed position of the valve member 176 is shown in FIG. 3 and its open position is shown in FIG. 7 as will be further explained.

Referring further to FIGS. 3 and 3B the valve housing 14 has the air inlet bore or passage 184 spaced radially from the central bore 150 with its top opening at the flat valve seat 158 under the disc valve 160. The bottom end of the bore 184 is joined with the radial bore 186 (see also FIGS. 2 and 3) of slightly larger diameter. The pressure-sensing passage or duct 188 extends from the inset bottom end 190 of the valve housing 14 to a position intermediate the housing where the larger diameter radial bore 192 intersects therewith. These side radial bores 186 and 192 are so positioned in relation to each other and in relation to the slot 146 and the hole 148, that in the assembled condition of the pump they register therewith, respectively as shown in FIG. 2.

On the other side of the valve housing 14 there is provided the mix inlet bore or passage 193, with its top end opening at the flat valve seat 158 under the disc valve 160 and its bottom end communicating with the angle bore 194, the latter opening to the space 196 under and around the annular locking shoulder 30. The bore or port 194 is in open communication with the contents of the mix tank, i.e. above the bottom 28 thereof.

The side hole 148 and the bore 186 register to provide a seat for the air hose plug fitting 198, fitted with the O-ring 200 and a suitable tip 202 to engage, respectively, within the bore 186 and within the elbow bend connection 204. This latter part connects to the air hose 206 having at its extended end the air meter orifice plug 208. Three or more such orifice plugs are supplied with the pump of this invention, each having different sizes of orifices 210 for overrun adjustment, i.e. control of the amount of air per piston stroke. The orifice plug 208 is located above the liquid level of the mix composition.

A similar plug 212, also fitted with an O-ring engages through the slot 146 and in sealed relationship with the side bore 192. The plug 212 connects to the pressure hose line 214 leading to the diaphragm housing 216 of the pressure switch 218 (see FIGS. 1, 2 and 4) supported by the wall 18 of the motor drive housing 20.

The details of the pressure switch 218 will be described in relation to FIG. 8, since the switch shown therein is identical in parts and operation, except for the manner of mounting to the assembly. In one form the pressure switch is held in place by the quick release wing nuts 220. The source of current for the drive motor 56 and its connections to the motor, the pressure switch and overload reset button 222 are omitted for simplicity.

The tubular outlet 46 communicates with the freezing chamber 48 in the manner shown at the bottom of FIG. 4. The freezing chamber is provided with the driven shaft 224 connected to a drive motor (not shown). This shaft carries the agitator blades 226 of appropriate design to thoroughly mix the confectionary product as it freezes and also prevents solidification thereof. The freezing coils for chamber 48 are omitted for simplicity and their arrangement is a matter of choice. The inwardly extending circumferential flange 228 provides a seat for the conical flexible seal 230 carried by the shaft 224, the edge of which engages the flange as the shaft rotates to seal that end of the freezing chamber. The other end of the freezing chamber is fitted with a suitable dispensing valve (not shown) for the product.

From the description thus far it is seen that as the drive motor 56 turns, the drive wheel 62 reciprocates the connecting rod 86 and the piston 70 reciprocates within the cylinder housing 12. On each upstroke of the piston 70, the mix is drawn through the mix inlet bore 193 past the one-way disc valve 160 into the mixing chamber 73 below the piston and simultaneously air is drawn through the orifice 210 of the plug 208 and into the bore 184, past the disc valve 160 into the mixing chamber 73. The discharge valve 176 is held in the closed position by the upward stroke of the piston 70.

On each downstroke of the piston 70, the disc valve 160 is closed and the mixture of air and mix composition is discharged into the center bore 150, the cross bore 168 and out past the valve 176 as shown in FIG. 7. The pressure switch 218 is connected via the pressure line 214, the passage 188 to the bottom opening 44 at the inset 190 to the downside of the valve 176, that is, to the freezing chamber 50 during operation.

Referring to FIGS. 5, 6 and 8 a modification of the aforesaid pump is shown for installation at a point remote from the freezing chamber but using the same drive system, clamp and valves with a modified port system and pressure sensing arrangement. The modified pump 10a can therefore have the same displacement and capacity as the pump 10, but the overall length of the assembly is shorter since it does not extend into the mix container. The same parts will bear the same numerals and additional details of other parts will become apparent. One such detail comprises the spacer flange 232 (FIG. 8) at the inner end of the bushing 90. Another is the key 234 locking the drive shaft 60 to the drive wheel 62. In this embodiment a mounting panel 240 is used to illustrate a mounting means for the drive motor 56 and a separate cabinet 242 houses the pressure switch 218, which is the same as the pressure switch used for the embodiment shown in FIG. 4 except that it is mounted for direct attachment to the pump 10a.

The overload button 222 is located on the side of the cabinet 242 as well as the outlet 244 to which the motor 56 is connected by means of the cord 246. The clamp assembly 16 is the same structurally. The drive wheel 62, the crank pin 66 and the connecting rod 86 are likewise the same so as to be interchangeable with pump 10, although, if desired, these parts can be proportioned in size to accommodate a shorter or longer stroke. The pressure diaphragm housing 216 has been relocated to the bottom of the panel 240 and the pressure hose 214 eliminated. The housing 216 has been modified to include a protruding connector 246, which snap-fits into the outlet of the pump, to be described. Just above the hose connector 246 there is provided the T-bracket 250 having the flange 252 with the arcuate edge 254. At the ends of the flange 252 a pair of upstanding tabs 256 and 258 are provided, each having a forward facing rounded notch as indicated at 260 and 262, the latter being larger than the former.

The piston 264 is slightly modified to include one O-ring 268. Its mode of attachment to the connecting rod 86 is the same as before described. The pump cylinder housing 270 is shorter and has the mix chamber 272 communicating with the larger bottom opening bore 274 at the bottom defined within the shorter lower portion 276. The axially spaced annular grooves 278 are spaced to register with the arcuate notches 104 and 106 of the bracket assembly 16.

The shorter pump valve housing 280 has the upwardly extending section 282 of lesser diameter which seats within the bore 274 and is sealed therein by means of the O-ring 284 while the lower edge 286 of the neck portion 276 rests upon the top 288 of the radial flange 290 of the valve housing 280. The lower section 292 of the pump valve housing 280 is inset at 294 and provides the groove and seat arrangement for the frustum shaped one-way discharge valve 176 as previously described. This lower section is sealed within the bore 295 of the adaptor 296 by means of the O-ring 297. The pump discharge outlet passage 150a and the cross bore 168a in the valve housing correspond to those of pump 10.

The top boss 154, through which the shorter passage 150a communicates with the mix chamber 272 supports the one-way intake disc valve 160 as previously described which extends over the air intake bore 184a and the mix intake bore 192a, each having the communicating cross bores 298 and 300 respectively, but in this case located on opposite sides of the valve housing 280. The air intake plug 198, the elbow bend and air orifice meter 208 are the same in function as previously described with only minor modifications of structure including the formation of the plug and elbow bend as integral parts, as illustrated.

The mix intake plug 302 fits within the bore 300 in sealed relationship by means of the O-ring 304 in a suitable groove and has a flange 306 with an annular recess 308 and a neck portion 310 adapted to receive a flexible tubing (not shown) which leads to a mix tank at a remote location. The passageway therein 312 communicates with the bores 300 and 192a with the plug in place.

The lower discharge adaptor 296 has the offset shoulder 314 at the top defining a circular upstanding seat 316 upon which the lower edge 318 of the flange 290 of the valve housing 282 rests. The notch 260 of the tab 258 engages around the neck of the elbow bend 204 and the notch 262 of the tab 256 engages around the annular groove 308 of the mix intake plug 302 (see FIG. 6), while the arcuate notch 254 of the flange 252 encompasses the back side of the annular groove defined between the offset 314 and the bottom edge 318 of the flange 290. The discharge of aerated mix composition through the valve 176 into the bore 295 passes through the bore 320 of the neck 322 at the bottom of the lower discharge adaptor. This latter is provided with an extended neck to attach within a flexible hose (not illustrated) leading to the freezing chamber.

On the back side of the adaptor 296 a bore 324 communicating to the bore 295 is provided, which forms a connecting recess for the neck 326 of the connector 246 of the diaphragm housing 216. The neck 326 defines the passage 328 opening to the pressure chamber 330. The pressure responsive diaphragm 332 is seated within a flat-walled annulus on the back side of the housing 216. The diaphragm 332 has its other side against the movable pressure plunger 334 operating within the bore 336 of the support plate 338. The central spring guide seat 340 houses the switch plunger 342, the extended end of which is in contact with the other side of the pressure plunger 334. This latter element has the guide legs 344 spaced from the spring 346 as the latter maintains the plunger 334 against the diaphragm 332. The screw 348 is used to adjust the pressure at which the switch plunger 342 activates the micro switch 218.

The installation of the modified pump 10a in its supporting brackets is the same as the pump 10 except that the bayonet lock is omitted and the T-bracket 250 engages the lower end of the pump valve housing, with the bore 324 and its engagement with the neck 326 serving as an aligning register. FIG. 6 shows how the openings 260 and 262 engage over the elbow bend 204 and the groove 308 of the plug 302, respectively, in the mounting. The pump 10a is thus aligned by the clamp assembly 16 and supported by the partially encompassing flange 252.

In both pumps of this invention the liquid mix composition and air are drawn simultaneously into a common mixing chamber. This simultaneous pumping action produces a reduced air bubble size in the mix composition. As the aerated mix passes the valve 176 further reduction in the size of the air bubbles takes place to produce a smoother appearing, better tasting product in the freezing chamber. Also the need for mechanical blending of the air in the product during freezing is reduced and the freezing chamber can be of more simple design. Freezing efficiency is indirectly increased because less mechanical working is needed in the freezing chamber.

Sanitizing of the pump of this invention is accomplished by pouring a sanitizing solution into the mix tank and, by means of a selector switch, the pump and beater are run without refrigeration. The pump will circulate the sanitizing solution through the passages of the valve housing and into the freezing chamber where it is brought into contact with all surfaces by the beater. The dispensing valve is then opened slowly to remove the sanitizing solution since it is at about 30 pounds pressure.

After sanitizing, to start up the device it is only necessary to pour at least 2 gallons of mix composition into the mix chamber, start the pump and immediately open the dispensing valve at the freezer with a container under the outlet, to allow the pump to push out the sanitizing solution. When mix appears at the dispensing valve, this valve is closed. A selector switch is used and an "automatic" position is provided whereby the machine will pressurize and freeze the mix and then shut off automatically. To eliminate any air pockets in the freezing chamber the dispensing valve is opened slowly without the beater in operation to bleed off the entrapped air through the nozzle. When the machine is cleared of air, the selector switch is turned to "automatic" with the dispensing nozzle closed and the machine is ready for operation after consistency tests on the product.

The pump of this invention is primarily designed for use in the preparation of confectionery products and for use with soft serve machines, shake machines, hard ice cream machines, slush machines, batch machines and the like. The pump can be used to proportion and mix various other fluid ingredients for discharge as a uniform multi-phase dispersion or mixture for other purposes and can be used with or without a pressure-sensing control passage 188 or 328. More than one discharge or outlet passage can be provided if desired. The seal between the discharge outlet 36 of the container for one ingredient and the processing vessel neck 46 can be a permanent weld, or other sealing means can be used at this juncture.

The metering or flow control means 208 can comprise a variable orifice valve in place of the individual orifice plugs. Other means for restricting the flow can be used, such as providing different diameters for the inlet passages within the valve body to gain the desired proportioning of ingredients where variation of flow volume during processing is not desired. The pressure-sensing passage (188 or 192a) can be eliminated or closed off when the pump is used for processes not involving the monitoring of pressure. A Scotch-yoke or a cross-head and guide combination can be used in place of the crank drive 66 disclosed where straight line motion to the piston is desired or conditions require a more tightly enclosed top for the cylinder 12 than is provided by the sanitary cover 22 disclosed. The pump disclosed in FIG. 5 is enclosed with a cover similar to the cover member 22 when in use at a food service counter.

Any suitable materials can be used to construct the parts of the pump and its fittings for their intended purpose. Use of the pump to prepare confectionery mixes for further processing requires that the pump and associated parts be manufactured of materials which meet the high standards of chemical inertness, durability and non-toxicity adhered to by the food industry. Accordingly the O-ring seals and the flexible one-way valve members are normally constructed of food grade plastics such as food grade neoprene, a synthetic rubber (polymerized chloroprene). and the lower valve housing and piston are preferably constructed of the proprietary plastic known as Delrin, an acetal resin.

For other applications nylon and fluorocarbons such as the proprietary product known as Teflon can be used for these parts as well as the plug fittings and adaptors. For food processing, the cylinders 14 or 270 are constructed of 304 stainless steel or the like. The tubes used as flexible conduits and other fittings may be made of polyvinyl chloride resin, known under the proprietary name of Tygon. All plastics used must be formulated to meet high standards of durability, abrasion resistance, impact, tensile and compression strengths and chemical inertness.

What is claimed is:

1. A pump for proportioning, mixing and discharging the fluid ingredients of a composition comprising:
   a housing defining a tubular bore portion at one end and an enclosing valved portion at the other end;

a piston reciprocatable in said tubular bore portion to and from said valved portion in alternate intake and exhaust strokes and defining therebetween a mixing chamber;

said valved portion including at least a pair of longitudinally disposed and radially spaced inlet passages for said fluid ingredients and an outlet passage for said mixed composition extending in open communication from said mixing chamber at one end to the other end of said valved portion;

said inlet passages having their inlet ends extending radially through the sides of said valved portion in spaced relationship from said other end thereof;

said valved portion defining a generally flat transverse intake valve seat at said one end facing said mixing chamber and intersecting said inlet passages;

flexible one-way valve means retained by said valved portion and disposed radially over said intake valve seat allowing said fluid ingredients to enter said mixing chamber simultaneously on the intake stroke of said piston;

said valved portion defining an exhaust valve seat at said other end and intersecting said outlet passage;

flexible one-way valve means retained by said valved portion and disposed over said outlet passage permitting discharge of the fluid ingredients from said mixing chamber on the exhaust stroke of said piston; and metering means to control the flow of one of said fluid ingredients into its respective inlet passage.

2. A pump in accordance with claim 1 in which said valved portion includes:

a pressure-sensing duct extending in open communication from the side of said valved portion to said other end thereof and off-set from said exhaust valve seat; and means provided to connect said pressure-sensing duct at its side opening to a pressure-responsive device to monitor the pressure of said discharged flud ingredients.

3. A pump in accordance with claim 1 in combination with a processing vessel and a container for one of said fluid ingredients in liquid form;

said processing vessel having its bottom wall common with the top wall of said processing vessel and having an inlet opening through said common wall;

the inlet end of one of said inlet passages being spaced above the inlet end of the other inlet passage; and means to releasably seal and support the other end of said valved portion within said inlet opening in said common wall whereby the higher inlet end is open to the atmosphere above said liquid ingredient and the other inlet is open to said liquid ingredient.

4. A pump in accordacne with claim 1 including:

an adaptor received over said exhaust valve seat and spaced therearound to define an exhaust chamber having a discharge end for said mixed ingredients; and a side port in said adaptor communicating with said exhaust chamber at one end and having a pressure-responsive member at the other end to monitor the pressure in said exhaust chamber.

5. A pump in accordance with claim 1 in which:

said valved portion is removable from said tubular portion, includes a cylinder head telescoped with and closing said tubular bore in sealed relationship and defines a valve port for each of said fluid inlet passages facing said mixing chamber;

said one-way valve means therefor comprises a flexible disc valve member extending across each of said valve ports; and;

means holding said flexible disc valve member centrally against said cylinder head with the periphery thereof extending laterally over said valve ports.

6. A pump in accordance with claim 1 in which:

said valved portion is removable from said tubular portion, includes a cylinder head telescoped within and closing said tubular bore in sealed relationship and defines an essentially flat valve seat transverse the ends of each of said fluid inlet passages said one-way valve means therefor comprises a flexible disc valve member disposed against said flat valve seat and adapted to open therefrom upon the intake stroke of said pistion and to close thereagainst upon the exhaust stroke of said pistion; and the respective inlet ends of said inlet passages extend radially through the sides of said valved portion in longitudinally spaced relationship whereby the uppermost inlet is above the liquid level of a container for said composition, the lowermost inlet is below said liquid level.

7. A pump in accordance with claim 1 in which:

said valved portion includes a cylinder head closing said tubular bore;

a central boss extending from said cylinder head and spaced radially inward from said fluid inlet passages;

an annular groove at the base of said central boss;

one wall of said groove extending radially therefrom to define a generally flat valve seat defining a wall of said mixing chamber and intersecting said fluid inlet passages; and said one-way valve means therefor comprises a flexible disc valve member disposed upon said valve seat;

said flexible disc valve member having a central aperture engaging over said boss with the inner periphery of said aperture engaged within said annular groove.

8. A pump in accordance with claim 1 in which:

said valved portion includes an axial extension of lesser diameter at said other end and axially spaced from said mixing chamber;

said exhaust valve seat comprising an annular recessed groove about the periphery of said axial extension;

said outlet passage extends radially to define a valve port with said recessed valve seat; and said one-way valve means comprises a flexible tubular outlet valve member retained within and encompassing said annular recessed valve seat to close said outlet passage on the intake stroke of said piston and allow the opening of same on the exhaust stroke.

9. A pump in accordance with claim 1 in combination with a processing vessel and a container for one of said fluid ingredients in liquid form:

said processing vessel having its bottom wall common with the top wall of said processing vessel and having a tubular inlet opening through said common wall;

said other end of said valved portion of said pump being adapted to be received in sealed telescoping relationship within said tubular opening;

an annular radial flange on said valved portion spaced from the telescoping portions with at least a pair of circumferentially spaced notches therein;

the upper surface of said flange defining spiral cam surfaces leading from one side of said notches; and bayonet-type lugs associated with said tubular opening having inwardly extending and radially spaced projections thereon whereby said other end of said valved portion is insertable within said tubular opening with said projections passing through said spaced notches to engage over said cam surfaces of said radial flange upon turning said pump about its longitudinal axis and thereby maintain one of said inlet passages open to said liquid ingredient in said container and said outlet passage in communication with said processing vessel.

10. A pump in accordance with claim 9 wherein:

said tubular bore portion and said valved portion are separable units, the inlet end of the valved portion extending within said tubular bore portion in sealed telescoping relationship; and supported releasable clamp means are provided for said telescoping units to hold same in longitudinal alignment with said tubular opening of said processing vessel.

11. In a machine for manufacturing and dispensing a confectionary product the combination of:

a container for liquid mix composition;

a freezing chamber with means to maintain a freezing temperature therein;

a pump including a housing defining a tubular bore portion at one end and a valved portion enclosing the other end;

a piston reciprocatable in said tubular bore portion to and from said valved portion in alternate intake and exhaust strokes and defining therebetween a mixing chamber;

said valved portion defining a valve seat opening to said mixing chamber;

at least a pair of inlet passages for said fluid ingredients opening at said valve seat, one of said inlet passages being connectable at its other end to said container for liquid mix composition, and another of said inlet passages being open to the atmosphere;

air metering means to control the flow of air through said other inlet passage;

resilient one-way valve means supported on said valve seat allowing said fluid ingredients to enter said mixing chamber through said one inlet passage on the intake stroke of said piston;

said valved portion defining an outlet passage therethrough in communication with said mixing chamber at one end and defining a discharge port at the other end connectable with said freezing chamber;

resilient one-way valve means supported on said discharge port allowing mixed ingredients to discharge on the exhaust stroke of said piston;

drive means to reciprocate said piston; and pressure responsive means in communication with said discharged mixed ingredients to immobolize said drive means at a predetermined pressure within said freezing chamber.

12. A pump for proportioning, mixing and discharging the fluid ingredients of a composition comprising:

a housing defining a tubular bore portion at one end and an enclosing valved portion at the other end;

a piston reciprocatable in said tubular bore portion to and from said valved portion in alternate intake and exhaust strokes and defining therebetween a mixing chamber;

said valved portion including at least a pair of inlet passages for said fluid ingredients and an outlet passage for said mixed composition;

a first axial extension of lesser diameter defined by said valved portion directed toward said mixing chamber;

a second axial extension of lesser diameter defined by said valved portion on the side away and axially spaced from said mixing chamber;

an annular circumferential groove around the base of said first axial extension;

one wall of said groove extending radially therefrom to define a generally flat valve seat defining a wall of said mixing chamber and intersecting said inlet passages;

said inlet passage having one-way valve means permitting discharge of the fluid ingredients from said mixing chamber on the exhaust stroke of said piston;

said one-way valve means comprising a flexible disc valve inlet member having a central aperture engaging over said first axial extension with the inner periphery engaged within said annular groove;

an annular recessed circumferential valve seat defined by said second axial extension;

said outlet passage extending from said first axial extension in open communication with said mixing chamber at one end and in open communication with said annular recessed valve seat in said second axial extension at the other end;

said outlet passage having one-way valve means permitting discharge of fluid ingredients from said mixing chamber on the exhaust stroke of said piston;

said one-way valve means therefor comprising a flexible tubular outlet valve member having a wall of tapering thickness to define a more rigid base and a thinner more flexible end;

said flexible tubular outlet valve member having its thinner more flexible end closing over the end of said outlet passage; and metering means to control the flow of one of said ingredients into its respective inlet.

13. A pump in accordance with claim 12 in which:

one of said inlet passages comprises a longitudinal bore open at its top end at said flat valve seat and communicating with a radial side bore in said valve portion;

the other of said inlet passages comprises a longitudinal bore open at its top end at said flat valve seat circumferentially spaced from said one inlet passage and communicating with a radial side bore in said valve portion below the radial side bore of said other inlet passage; and said outlet passage comprises a longitudinal central bore open at its top end through said first axial extension and communicating with a cross bore in said second axial extension through to said annular recessed valve seat.

14. A pump in accordance with claim 12 for the preparation of a proportioned aerated mixture of a liquid confectionery composition in combination with:
a container for said liquid composition and a processing chamber for said aerated mixture;
said container having a top opening and a recessed tubular bottom opening axially aligned therewith and sealed to and in communication with said processing chamber;
a base member around said second axial extension of said enclosed valve portion adapted for insertion into and locking within said recessed tubular bottom opening of said container in sealed relationship with said open-topped cylinder extending through and above said top opening thereof;
one of said inlet passages comprising an air inlet communicating with a side opening of said valve body above the liquid level of said container;
crank means connectable with said piston for reciprocation thereof within said cylinder; and
releasable clamp means for said open-topped cylinder to maintain said cylinder and the piston in a fixed radial position below said crank means.

15. A pump in accordacne with claim 12 in which:
said other inlet passage comprises a longitudinal bore open at its top end at said flat valve seat and communicating with a radial side bore in said valve portion;
said metering means comprises plug means adapted to be inserted into said side bore and connectable with an orifice plug open to the atmosphere;
the other of said inlet passages comprises a longitudinal bore open at its top end at said flat valve seat circumferentially spaced from said one inlet passage and communicating with a radial side bore in said valve portion substantially opposite said radial side bore for said one inlet passage;
plug means adapted to be inserted into said second side bore and connectable with a conduit in communication with a source of a liquid ingredient, both of said plug means extending radially from said valve portion;
an adaptor engageable over said second axial extension in sealed reltationship and circumferentially spaced from said flexible tubular outlet valve member;
said adaptor defining an annular circumferential recess with said housing;
a support bracket for said pump including a flange member having a pair of upstanding spaced ears and a semi-circular open edge therebetween;
front opening arcuate notches in said ears;
said support bracket adapted to receive said pump with the semi-circular open edge thereof within the annular circumferential recess of said housing and with said arcuate notches of said ears receiving the radially extending portions of said plug means.

16. A pump in accordance with claim 15 in which:
said inlet radial side bores for said fluid ingredients are positioned substantially opposite each other,
said adaptor includes a third radial bore positioned intermediate said inlet bores on the back side of said pump;
a mounting panel supporting said brackets;
a pressure responsive device having a diaphragm-operated piston connected to a micro switch, mounted from said panel;
said pressure responsive device including an adaptor plug with a bore communicating with the opposite side of said diaphragm; and
said adaptor plug being registerable with said third radial bore as said housing is aligned with said bracket for clamping thereon.

17. A pump in accordance with claim 15 including:
a second support means adapted to releaseably clamp around said tubular bore portion including circumferentially registering mating means to hold said tubular bore portion in predetermined axial and lateral alignment with said first support bracket.

18. A pump in accordance with claim 12 in which:
said flexible tubular outlet valve member having its thinner more flexible end closing over the bottom end of said outlet passage;
said second axial extension defines an offset shoulder with said valved portion;
said valved portion includes an elongated passageway communicating at its bottom end with said offset shoulder and communicating with a radial side bore in said valve portion; and
means are provided for connection with said elongated passageway to detect the pressure of discharged composition from said pump.

19. A pump in accordance with claim 18 in which:
said open-topped cylinder and said valve portion are separable units with the former extending in part over the latter in telescoping sealed relationship;
said radial side bores for one of said inlet passages and said pressure sensing passageway extending through said valve portion within the telescoping portion thereof with said tubular portion; and
a pair of openings in said telescoping tubular portion registerable with said radial cross bores.

20. A pump in accordance with claim 19 in which:
said radial cross bores for said one inlet passage and said pressure sensing passage are aligned with the former above the latter and the opening registerable with said pressure sensing radial bore comprising an open bottomed slot.

21. A pump for mixing and discharging a blend of fluid ingredients comprising:
a pump body defining a tubular portion, an enclosing intermediate head portion and an exhaust chamber;
a piston within said tubular portion adapted to reciprocate to and from said head portion in alternate intake and exhaust strokes and defining therebetween a mixing chamber;
a peripheral generally flat intake valve seat on one side of said intermediate head member defining a wall of said mixing chamber and having intake passages thereabout for said fluid ingredients;
conduit means connecting said intake passages to separate sources of said fluid ingredients;
an annular recessed exhaust valve seat on the other side of said intermediate head member defining an inner circumferential wall of said exhaust chamber; through said intermediate head member to said recessed exhaust valve seat;

a single flexible intake valve member disposed across said intake valve seat and adapted to open said intake passages simultaneously on the intake stroke;

a tubular flexible exhaust valve member encompassing said annular recessed valve seat and adapted to close on the intake stroke of said piston and open on the exhaust stroke;

said intermediate head member includes a passage communicating from said exhaust chamber to the exterior of said head member; and a pressure-sensing means is provided for said passage to monitor the pressure in said exhaust chamber.

22. A pump in accordance with claim 21 including:

metering means to control the flow of one of said fluid ingredients into its respective conduit.

23. A pump in accordance with claim 21 in which:

said tubular portion is open at one end and includes a pair of axially spaced circumferential grooves on its exterior;

said piston is connected to a connecting rod member extending from the open end of said tubular portion;

a rotatable crank means is provided for detachable connection with said extended end of said connecting rod;

clamp means are provided for said tubular portion to detachably hold said pump body in radial alignment with the axis of rotation of said clamp means;

said clamp means including a pair of spaced arcuate flanged edges adapted to mate within the respective exterior grooves of said tubular portion; and a pivotal latch member is provided adapted to span around said tubular portion and hold same against said arcuate flanged edges.

24. A pump in accordance with claim 21 in which:

said tubular portion includes a bottom section of larger diameter than the portion encompassing said piston;

said valve portion includes a top portion of lesser diameter than a base portion thereof with a shoulder therebetween and the bottom portion of said tubular portion fits over the top portion of said valve portion in telescoping and sealed relationship.

25. In a machine for manufacturing and dispensing a confectionery product, the combination of:

a container for liquid mix composition and a freezing chamber therebelow;

said mix container having a recessed tubular bottom opening sealed to and in communication with a top opening of said freezing chamber;

a top opening in said mix container axially aligned with said tubular recessed bottom opening;

support means associated with said mix container;

reciprocatable drive means carried by said support means;

clamp means carried by said support means and spaced under said drive means;

an elongated single action piston pump having an opentopped cylinder, a piston reciprocatable therein and a connecting rod for removable connection with said reciprocatable drive means;

said cylinder having an enclosing valve housing at the bottom thereof defining a transverse valve seat and a mixing chamber thereabove and under said piston;

said valve housing including an air inlet passage and a mix inlet passage both separately communicating through said valve seat with said mixing chamber said mix inlet passage in said valve housing having its inlet spaced below the inlet of said air passage;

a flexible one-way inlet valve member disposed upon said transverse valve seat controlling the opening of both said air and mix inlet passages to said mixing chamber;

said valve housing having a bottom end of reduced diameter and adapted to be removable engaged in sealed relationship with said tubular recessed bottom opening of said mix container;

a discharge passageway in said valve housing communicating from said mix chamber to the bottom end thereof; and a one-way flexible discharge valve member controlling the bottom opening of said discharge passageway whereby said piston pump is adapted to be inserted into and removed from a position within said clamp means with its bottom end in sealed relationship with said freezing chamber and in axial alignment and in operable connection with said drive means through said connecting rod and with its air inlet above and its mix inlet below the liquid level of said mix container.

* * * * *